US008641397B2

(12) United States Patent
Hennes

(10) Patent No.: US 8,641,397 B2
(45) Date of Patent: Feb. 4, 2014

(54) SPIRAL DISTRIBUTOR, DIE HEAD, BLOWN FILM LINE, AND METHOD FOR MANUFACTURING A BLOWN FILM

(75) Inventor: Jochen Hennes, Eschborn (DE)

(73) Assignee: Reifenhaeuser GmbH & Co. KG Maschinenfabrik, Troisdorf (DE)

( * ) Notice: Subject to any disclaimer, the term of this patent is extended or adjusted under 35 U.S.C. 154(b) by 166 days.

(21) Appl. No.: 13/068,900

(22) Filed: May 23, 2011

(65) Prior Publication Data

US 2011/0304070 A1    Dec. 15, 2011

(30) Foreign Application Priority Data

Jun. 10, 2010  (DE) ...................... 10 2010 023 300.5

(51) Int. Cl.
*B29C 47/20* (2006.01)
*B29C 47/90* (2006.01)

(52) U.S. Cl.
USPC ....... 425/72.1; 264/209.5; 425/380; 425/461; 425/467

(58) Field of Classification Search
USPC ............... 425/66, 72.1, 133.1, 380, 461, 467; 264/264, 209.5
See application file for complete search history.

(56) References Cited

U.S. PATENT DOCUMENTS

| 4,115,047 A * | 9/1978 | Stelmack ..................... 425/72.1 |
| 4,185,954 A | 1/1980 | Murakami et al. |
| 6,565,347 B1 | 5/2003 | Linkies et al. |
| 6,866,498 B2 | 3/2005 | Sagar et al. |
| 2005/0140046 A1 | 6/2005 | Hessenbruch |
| 2005/0214400 A1 | 9/2005 | Hessenbruch |

FOREIGN PATENT DOCUMENTS

| CA | 2500862 A1 * | 9/2005 |
| DE | 199 24 540 | 11/2000 |
| DE | 103 60 360 | 7/2005 |
| DE | 10 2004 014 096 | 10/2005 |
| EP | 0 655 312 | 5/1995 |

(Continued)

OTHER PUBLICATIONS

"Extrusionswerkzeuge für Kunststoffe und Kautschuk: Bauarten, Gestaltung und Berechnungsmöglichkeiten"; "Extrusion tools for plastic materials and rubber: configurations, design and calculation possibilities" by Walter Michaeli, with the cooperation of Ulrich Dombrowski . . . , second completely revised and extended edition; Munich, Vienna; Hanser-Verlag 1991, ISBN 3-446-15637-2 more specifically shows different spiral mandrel distribution tools starting at p. 159. On p. 160 line 4f, pp. 158-161.

(Continued)

*Primary Examiner* — Yogendra Gupta
*Assistant Examiner* — Joseph Leyson
(74) *Attorney, Agent, or Firm* — Collard & Roe, P.C.

(57) ABSTRACT

A spiral distributor for a die head of a foil extrusion line has spiral channels provided with shortening sections in their backward area. As compared to a geometrical rule for a discontinuation of the spiral channels which is valid in a prior section of the spiral channels, this arrangement leads to a faster discontinuation of the spiral channels. The design of the backward area of the spiral channels does not affect the good overlaying effect of the front part of the spiral channels. As compared to the customary embodiment, the channels are thus equipped with a less profiled backward end which leads to a more cost-effective manufacture and to a lesser flow resistance.

10 Claims, 3 Drawing Sheets

(56) References Cited

FOREIGN PATENT DOCUMENTS

| | | |
|---|---|---|
| EP | 1 579 976 | 9/2005 |
| JP | 57-189820 | 11/1982 |
| SU | 1682197 | 10/1991 |
| WO | WO 88/01226 | 2/1988 |

OTHER PUBLICATIONS

"Extrusionswerkzeuge für die Schlauchextrusion" by Dipl.-Ing. Georg Burmann, ETA Kunststofftechnologie GmbH, dated Feb. 3, 2006.

Search Report of DE 10 2010 023 302.01 dated Jul. 5, 2011 with English translation of relevant portions.

* cited by examiner

US 8,641,397 B2

SPIRAL DISTRIBUTOR, DIE HEAD, BLOWN FILM LINE, AND METHOD FOR MANUFACTURING A BLOWN FILM

CROSS REFERENCE TO RELATED APPLICATIONS

Applicant claims priority under 35 U.S.C. §119 of German Application No. 10 2010 023 300.5 filed on Jun. 10, 2010, the disclosure of which is incorporated by reference.

BACKGROUND OF THE INVENTION

1. Field of the Invention

The invention relates to a spiral distributor for a die head of a blown film extrusion line, a die head for such a blown film line, a blown film line, a method for manufacturing a blown film as well as a blown film manufactured by means of this method.

2. The Prior Art

The die head is the extrusion tool and thus the technological core of a blown film extrusion line. Regardless of its concrete configuration, the object of the die head is to mold the melt. The melt reaches the die head from one or several melt threads at the inflow of the tool and is to leave the die head with a uniform, thermally and mechanically homogeneous melt distribution via the outflow cross-section, which is shaped as an annular gap, downstream at the outflow of the tool.

The configurations of die heads customarily used today can be divided roughly into two groups: on the one hand, the group including spiral distributors with a cylindrical or conical shape, on the other hand, the group including radial spiral distributors, which are also called coil distributors.

The document DE 103 60 360 A1 shows a die head for a nine-layered film.

The book "Extrusionswerkzeuge für Kunststoffe und Kautschuk: Bauarten, Gestaltung und Berechnungsmöglichkeiten"; "Extrusion tools for plastic materials and rubber: configurations, design and calculation possibilities" by Walter Michaeli, with the cooperation of Ulrich Dombrowski . . . , second completely revised and extended edition; Munich, Vienna; Hanser-Verlag 1991, ISBN 3-446-15637-2" more specifically shows different spiral mandrel distribution tools starting at p. 159. On page 160 line 4f, the book describes how completely avoiding weld lines and flow marks is one of the main advantages of a melt distribution system.

The document DE 199 24 540 C1 discloses a cylindrical spiral distributor with a surrounding rotating mandrel.

Another cylindrical spiral distributor can be gathered from the document WO 88/01226 A1.

U.S. Pat. No. 6,866,498 B2 also shows a cylindrical spiral distributor in which outlets initially lead from a pre-distributor to deviating supply grooves. The supply grooves have ending areas. The spiral channels start at the end of the ending areas of the supply grooves.

It is common to all die heads, that the melt stream delivered by the extruder is initially divided into several individual flows. Star or ring-shaped distributor systems are predominantly used to this end. These so-called pre-distributors lead into the spiral-shaped channels, which are worked either into a mandrel (in the case of an axial, cylindrical or conical spiral distributor) or into a plate (in the case of a radial spiral distributor). The spiral channels run around the mandrel in the form of a multiple thread or are disposed in the form of a multiple spiral on the plate.

The depth of a channel usually decreases to zero in the direction of extrusion. The gap between the mandrel, respectively the plate, and an opposite side correspondingly increases. The gap between the mandrel, respectively the plate, and the opposite side thus becomes bigger. This causes a melt stream flowing in a spiral to be continuously divided into two parts: on the one hand a part which flows over the spillover bars which are located between two spirals; on the other hand a part which follows the course of the spiral channels.

Due to the multiple-screw-shaped or multiple-spiral-shaped overlap of the spiral channels, the melt issuing from a channel overlaps with the melt from other channels. The melt issuing from a channel reaches a gap flow. Due to the overlap of individual channel flows, so-called weld lines are avoided and a quite uniform thickness distribution of the melt strand at the end of the spiral distributor as well as a high thermal homogeneity of the melt is additionally achieved.

The depth of the channels in the spiral distributor usually decreases with a constant rise of the floor of the spiral channel.

There are also embodiments in which the depth decreases at such a rate, that the reduction of the cross-section of the spiral channel is constant along its course. This means that the channel floor becomes flatter at a continuously faster rate.

SUMMARY OF THE INVENTION

The object of the invention is to propose an improved spiral distributor, an improved die head, an improved blown film line, an improved manufacturing method and thus an improved blown film.

According to a first aspect of the invention, the object is solved by a spiral distributor for a die head of a foil extrusion line with a central axis and with a distributor flow direction, the distributor flow direction lying parallel to the central axis in the case of an axial spiral distributor, radially in the case of a radial spiral distributor and in the case of a conical spiral distributor so that it is projectable onto the axis, the spiral channels running at an angle to the distributor flow direction, a first spiral channel passing a second adjacent spiral channel downstream from its beginning after an initial section and running on downstream in a further section, a spiral channel having a shortening section initiating from its further section.

The invention is based first of all on the following observation:

While the channel stream is still very big at the entry into the channel and thus generates a great overlap with other spiral channels, the channel stream considerably decreases toward the end of the spiral channel, because the depth of the channel is smaller there. The possible degree of an overlap is thus also reduced.

However, at the same time, the length of the spiral distributor and thus the pressure loss increase. The pressure loss that has thus been wasted cannot be used for narrower flow channels and for associated—desired—higher wall shear stresses. Higher wall shear stresses would lead to an improved self-cleaning of the die head and thus to shorter rinsing time and a lesser risk of fouling.

In a nutshell, the invention has thus recognized that a long, uniform course of the spiral channel from the further section to its end can cause disadvantages.

In contrast, it is now proposed that the spiral channel may be divided in two areas beyond the beginning of the overlap: on the one hand, the "further section", which will usually be considerably bigger than the shortening section; on the other hand, the "shortening section". In an extreme case, the latter can have a length of zero, namely if the spiral channel is suddenly cut off and ends even though channel depth is still available. The shortening section can alternately have a non-uniform course, a person skilled in the art still having the possibility to carry out a separation in two sections.

The following terms of the present invention must be explained:

The "blowing direction" should be that direction in which a line using the spiral distributor would blow out the foil in a hose shape. In a normal case, this would be perpendicular to the plane of the annular gap. It will usually be a vertical direction, in modern lines a vertical direction running upward, because blowing out is now carried out against the gravity.

In an axial spiral distributor, more specifically in the form of a cylindrical spiral distributor or in the form of a conical spiral distributor, the central axis, which runs in the blowing direction, even gives its name to the spiral distributor.

In a radial spiral distributor however, the plate will be horizontal. The melt stream either gets in from the outside or gets out from the inside, but is in any case diverted for blowing out. The blowing direction is thus also vertical there, that is perpendicular to the plate of the radial spiral distributor.

The "distributor flow direction" is a notional direction. Whether each individual particle in the flowing melt will indeed flow exactly in the distributor flow direction is certainly more than doubtful. The distributor flow direction should thus be understood as a purely geometrical, theoretical direction.

In the case of a cylindrical spiral distributor, the distributor flow direction should be understood as being parallel to the blowing direction, since the melt stream can theoretically flow in the blowing direction along straight lines on the lateral surface of the cylinder. In the case of a conical spiral distributor, the distributor flow direction in principle also runs parallel to the blow direction. The straight lines on the lateral surface through which the melt can theoretically flow indeed lie at an angle to the central axis. The distributor flow direction must however be understood as an overall resulting, virtual flow direction. On the one hand, it is only defined here in order to be able to describe the angle deviation of the melt channels, namely for both axial and radial spiral distributors. On the other hand, the inclinations of the individual theoretical melt flows along the circumference of a conical spiral distributor add up in such a manner that they result in a straight line which is coaxial with the central axis.

The host of straight lines running respectively obliquely relative to the vertical direction along the lateral surface of the cylinder stump must thus be respectively theoretically understood as a local distributor flow direction. Since however each spiral channel, which runs at an angle relative to such a host of oblique channels, also runs at an angle relative to the central axis, the central axis can be used as a measure for the angular position to simplify matters.

In a radial spiral distributor, the host of radially running straight lines is the "distributor flow direction".

The bar area is that area in which outlets for the melt streams are disposed on the spiral distributor, so that the melt is divided into many small streams by the outlets of the pre-distributor, namely by the pre-distributor apertures and reaches the actual spiral area in this manner.

The "beginning" of the spiral channels is that point in which the spiral channel runs at least substantially in its course direction in the further section and/or in the beginning section. In the prior art, both latter directions are the same. In an embodiment of the present invention a difference between these two directions can be observed.

The described "angle" is an angle of 0° to 90°; that is an acute angle. In other words, this means that in an axial spiral distributor, a projection of the spiral onto a vertical surface, which is perpendicular to the projection direction in the central axis, would show the spiral with such an angle relative to the central axis. In a radial spiral distributor, the angle is respectively measured locally relative to a radial beam.

"Downstream" designates a point which lies further in the direction of the blowing direction than an upstream point.

The "shortening section" thus lies—as seen in the course of a spiral channel—after the beginning, beginning section, transition section and the further section.

It is proposed that with regard to its course, the shortening section has a bend, a curve or a deviation. In other words, in its shortening section, the spiral channel abandons the otherwise straight course direction which it had since its transition section. It can subsequently run again in the original direction or parallel to it, a "straight" course direction being based on the development of the cylindrical or conical lateral surface. In the case of a radial spiral distributor, a "straight" course direction in the further section occurs if the angle between the spiral channel and the distributor flow direction remains constant along the length of the spiral channel. The angle also remains constant in cylindrical and conical spiral distributors.

Regarding its course after the bend, curve or deviation, the spiral channel can run again in its original direction in the shortening section.

It is however preferable, with regard to its course, if the spiral channel has another rise height in its shortening section than in its further section. It must more specifically be borne in mind that the spiral channel has a lesser rise height there and most notably has at least partially, preferably at the end, a rise height of zero.

The term "rise height" must be explained as being a complement to the angle relative to the distributor flow direction. When the rise height becomes big, the angle relative to the distributor flow direction becomes smaller to the same degree. The maximal rise height theoretically results from a spiral channel running in the distributor flow direction, and thus having an angle of 0° relative to it.

Shortening sections of several spiral channels can be merged. Most notably, this can be accomplished quite simply if the spiral channels in the shortening section are led to a rise height of zero, which means to an angle of 90° relative to the distributor flow direction. If the spiral channels run on in this direction and if the shortening section of the spiral channels transition into a rise height of zero at the same level, the channels automatically merge, if they do not have an end prior to that and are discontinued or cut off.

It is proposed that shortening sections of spiral channels form an annular gap around the spiral distributor. This can also be configured in a particularly easy way if the spiral channels are led to a rise height of zero and if the spiral channels are preferably merged.

Even without an actual merging of the spiral channels it is possible to refer to an annular gap, if an almost or actually continuous annular gap occurs at least predominantly around the spiral distributor.

The shortening section can have an increased flattening, with regard to the spiral channel depth, and/or an increased tapering, with regard to the spiral channel width, relative to the further section.

A shortening section configured in this manner must be understood as a sudden divergence from the geometrical rule of the further section in the transition section as compared to the originally constant course of the flattening or the tapering of the spiral channel width.

It is conceivable for instance that, with regard to its channel floor, the spiral channel rises from the beginning or in any case from the transition section onward and/or from the first rising phase in the further section onward and suddenly rises according to another geometrical rule in the shortening section. For instance, the rise of the channel floor could have been constant prior to that and be still constant but suddenly greater in the transition section; or it was constant in the further section and rises in contrast in the shortening section; or it already rose in the further section according to a geometrical rule and rises in the shortening section according to another geometrical rule.

It is also important here, that a person skilled in the art may recognize two different geometrical rules in order to distinguish the further section on the one hand from the shortening section on the other hand.

It is understood that the geometrical rule in the shortening section must lead to the spiral channel ending sooner than it would according to the geometrical rule of the further section. Only then does the shortening section achieve its object, at any rate if the course of the spiral channel is unimpaired.

If the course changes in the shortening section, it can also be conceivable that the geometrical rule of the shortening section does not lead to a shortening of the entire length of the spiral channel as compared to the geometrical rule of the further section, but to an end of the spiral channels, which lies less far downstream relative to the distributor flow direction than would have been the case according to the geometrical rule of the further section.

Thus, it is conceivable for instance that in the shortening section, the spiral channels have a curve in their course and discontinue with a lesser rise height than would have been the case according to the geometrical rule of the further section. In this case, the spiral channels in a cylindrical or conical axial spiral distributor end lower, if one postulates a beginning of the channels located at the lower end of the spiral distributor, respectively in the case of a radial distributor radially further inward, if one postulates a beginning of the channels located radially inside.

With regard to the channel floor rise in the shortening section, it is proposed that it amounts to at least twice a channel floor rise in the further section, preferably at least three times, most preferably at least four or five times.

It is understood that the advantages which are achievable by the spiral distributor described above directly extend to a die head for a blown foil line, which is equipped with such a spiral distributor.

The same applies to a blown film line with an extruder, a die head as described above, a flattening unit and an extractor device as well as preferably a wrapping station.

Finally, it is advantageous if such a blown film line is used in a method for manufacturing a blown film line.

Accordingly, the resulting blown film line is also of better quality if the method is adequately designed.

BRIEF DESCRIPTION OF THE DRAWINGS

In the following, the invention is further described with the help of an exemplary embodiment with reference to the drawings. In the drawings.

DETAILED DESCRIPTION OF PREFERRED EMBODIMENTS

Figure 1:
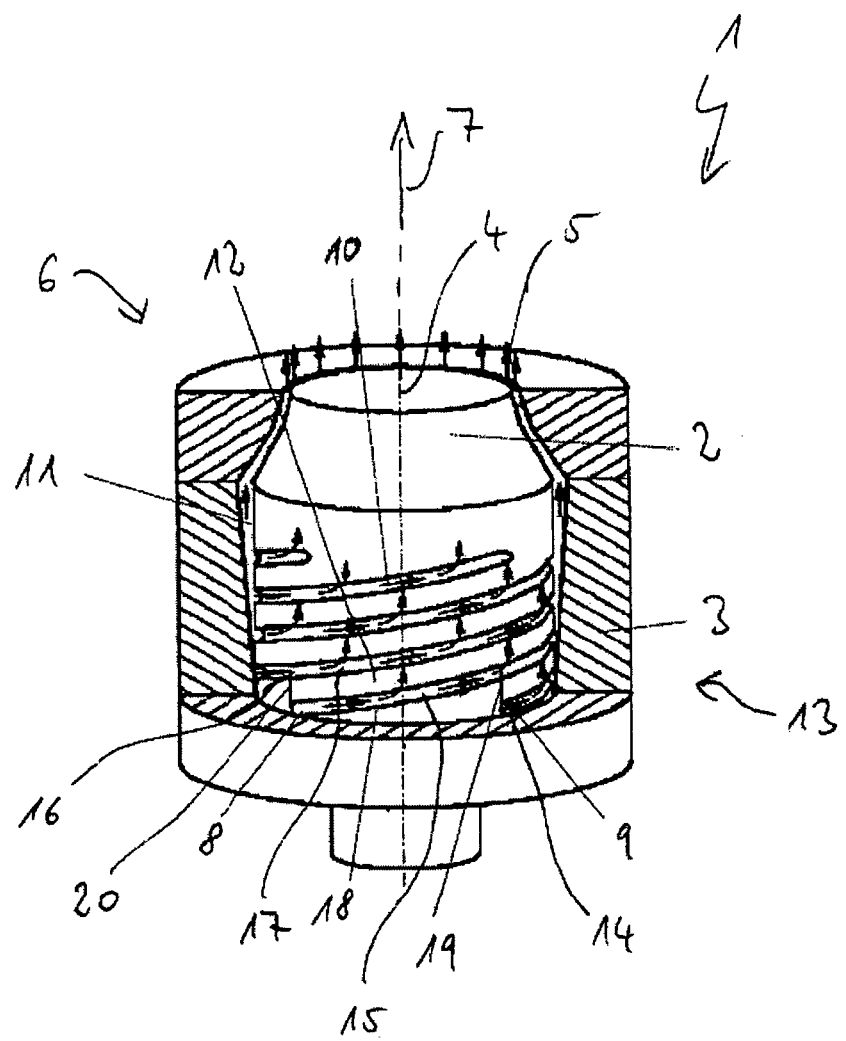
FIG. 1 shows a spatial, partially sectioned schematic view of a cylindrical axial spiral distributor according to the prior art.

The spiral distributor 1 in FIG. 1 is designed according to the prior art. It consists substantially of a central mandrel 2 which is surrounded by a mantle 3. In a pre-distributor (not shown), the melt stream supplied by an extruder (not shown) is initially divided into several individual streams, which flow into spiral-shaped channels. These are worked into the mandrel 1 and surround it in form of a multiple thread.

A central axis 4 is located coaxially to a ring-shaped outlet nozzle 5 at a downstream end 6 of the spiral distributor 1.

In a distributor flow direction 7, and thus in the extrusion direction, a channel depth of spiral channels 8, 9 (exemplarily labeled) decreases to zero at a channel end 10 (exemplarily labeled).

A gap 11 between the mandrel 1 and its opposite side formed by the mantle 3 increases continuously. This causes a melt stream flowing in a spiral to continuously divide into two parts: on the one hand a part which flows over a spillover bar 12 which is located between two spirals; on the other hand a part which follows the course of the spiral channels 8, 9.

The melt leaves the extrusion tool as homogeneously as possible through the annular gap 5.

In a bar area 13, the spiral channels 8, 9 run from beginnings 14 (exemplarily labeled), via beginning sections 15 (exemplarily labeled) to transition sections 16 (exemplarily labeled) and continuously onward in further sections 17 (exemplarily labeled).

There are several areas in the bar area 13 where an adherence of melt can be feared because of horizontally running lower edges 18 and vertical edges 19, 20 (exemplarily labeled).

Figure 2:
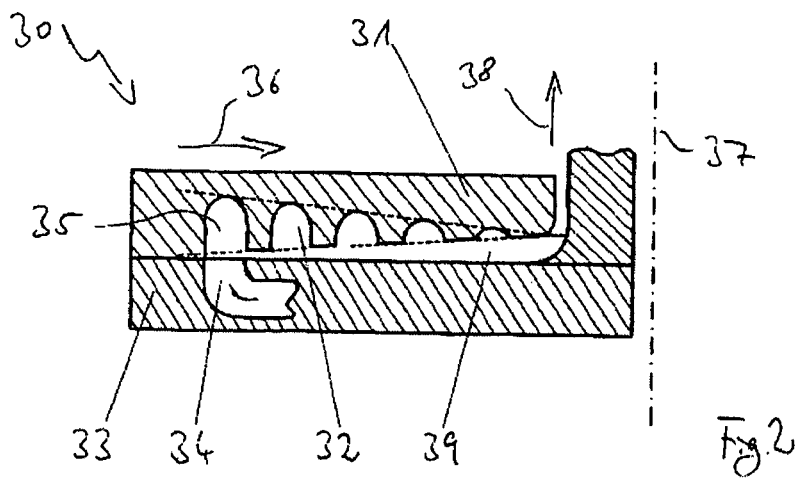
FIG. 2 shows a schematic radial section of one half of a radial spiral distributor according to the prior art, in which melt is fed to spiral channels radially outside.

The radial spiral distributor 30 in FIG. 2 which is also designed according to the prior art, consists substantially of a plate 31 in which spiral channels 32 (exemplarily labeled) are placed, and a counter plate 33 which also lies horizontally.

Regarding the risk of dead regions in the flow in the radial spiral distributor 30, the horizontal edges 18 and the vertical edges 19, 20 correspond to radial edges (not shown) which begin downstream of each spiral channel beginning (not shown) as well as edges (not shown) which follow the circumference of the distributor.

In the radial spiral distributor 30, the plastic melt is led during operation from pre-distributor channels 34 into beginnings 35 of the spiral channels 32. A channel depth of the spiral channels 32 decreases in the distributor flow direction 36, which is located radially toward a central axis 37, while the central axis 37 is located parallel to an extrusion direction 38, so that a gap 39 in the course of the distributor flow direction 36 increases.

Figure 3:
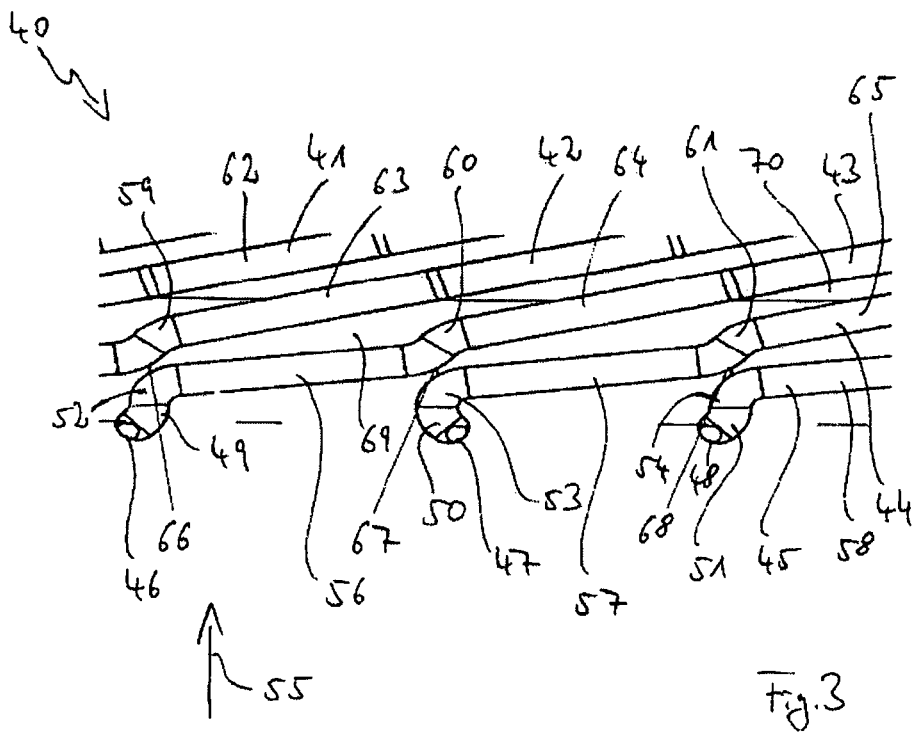
FIG. 3 shows a schematic development of advantageous spiral channels and FIG. 4 shows a schematic development of an upper end of a spiral distributor with spiral channels with shortening sections.

An intervention into the course geometry of the spiral channels 41, 42, 43, 44, 45 has occurred in a sectional development of the spiral distributor 40 in FIG. 3:

Starting from the pre-distributor (not shown), the outlets 46, 47, 48 are located on the cylindrical axial spiral distributor 40. They flow into feed sections 49, 50, 51, respectively two feed sections 50, 51 being bent in pairs toward each other in order to allow pre-distributor channels disposed in the spiral distributor 40 to be led in a more compact manner.

The aperture sections 49, 50, 51 are very short and extend only until the spiral channels 41, 42, 43, 44, 45 have the same geometry. Respectively one first deviation, namely of just under 90°, is located there at beginnings 52, 53, 54. For instance, the angle can amount to approximately 85°.

At this angle relative to a distributor flow direction 55, the spiral channels 41, 42, 43, 44, 45 run initially straight along their beginning sections 56, 57, 58 until they are located downstream of the beginning sections 52, 53, 54 of directly adjacent spiral channels 42, 43, 44, 45, which means further ahead when projected onto the distributor flow direction 55. There, they have double deviations 59, 60, 61, which however do not result in a continuing parallel course of the spiral channels 41, 42, 43, 44, 45 but rather transition via a slight deviation into a greater rise in further sections 62, 63, 64, 65. The rise, that is the complementary angle relative to the distributor flow direction 55 up to 90°, in turn remains constant in the further sections 62, 63, 64, 65; thus, the spiral channels 41, 42, 43, 44, 45 run again straight in the further sections 62, 63, 64, 65.

Thus, immediately after passing over critical vertical edges 66, 67, 68, all the distributor channels 41, 42, 43, 44, 45 initially run with a short steep rise and subsequently have a greater constant rise relative to the beginning section 56, 57, 58.

A greater rise hereby also exists after the transition sections with the double deviations 59, 60, 61. This course of the rise affects the distribution of the melt in a favorable manner and additionally leads to a higher volume flow at the edges 66, 67, 68 and hence to a reduction of spiral strips.

As a consequence of the initially flat rise in the beginning sections 56, 57, 58, the vertical edges 66, 67, 68 are additionally distinctly shorter than in the prior art.

The comparatively rather short vertical edges 66, 67, 68 define the beginning of overflow bars 69 (exemplarily labeled). These are initially very short in the overflow direction, which lies parallel to the distributor flow direction 55. A great volume flow of the melt can occur here.

As a consequence of the subsequently increased rise of the spirals respectively located downstream, the overflow bar 69 is bigger at the next overlap with the next beginning spiral channel and has a constant width 70 (exemplarily labeled). This is advantageous for a good distribution of the melt.

In a preferred form of the invention, the spiral channel briefly rise with a steep rise only after the vertical edges 66, 67, 68 and then transitions into a constant greater rise relative to the beginning section. A slightly higher bar width hereby already exists directly after the vertical edges. This also favorably affects the distribution and additionally leads to a higher volume flow at the edges and thus to a further reduction of spiral strips.

In other words, one aspect of the modification of the beginning area of the spiral channels can be that at least one spiral channel has another rise in at least one flow path than in the remaining flow paths.

The rise of the spiral channel in a first area of the flow path, which extends from the beginning of the spiral channel to the beginning of the overlap with the next adjacent spiral channel in the direction of rotation of the spiral channel, can more specifically be smaller than in the flow path sections of the spiral channel following downstream.

After the first area, the rise of the spiral channel can be distinctly greater in a second area, which is limited to the beginning of the overlap with the next adjacent spiral channel in the direction of rotation of the spiral channel, and can subsequently run on in a third area of the spiral channel with a constant rise, which is bigger than in the first and smaller than in the second area.

It can furthermore be provided that the rise in the first area is more than 0° but less than 20°, while adopting a maximum of far more than 30° in the second area and runs on in the third area with less than 30° but more than 10°.

With regard to the depth of the spiral channels it can be provided that the depth of at least one spiral channel in a first area, which extends from the beginning of the spiral channel to the beginning of the overlap with the next adjacent spiral channel in the direction of rotation of the spiral channel, is smaller than in the remaining areas and is either constant or decreases.

It can furthermore be provided that the depth of the spiral channel after the first area distinctly increases in a continuous manner in a second area, which is limited to the beginning of the overlap with the next adjacent spiral channel in the direction of rotation of the spiral channel, and subsequently decreases in a third area.

Figure 4:
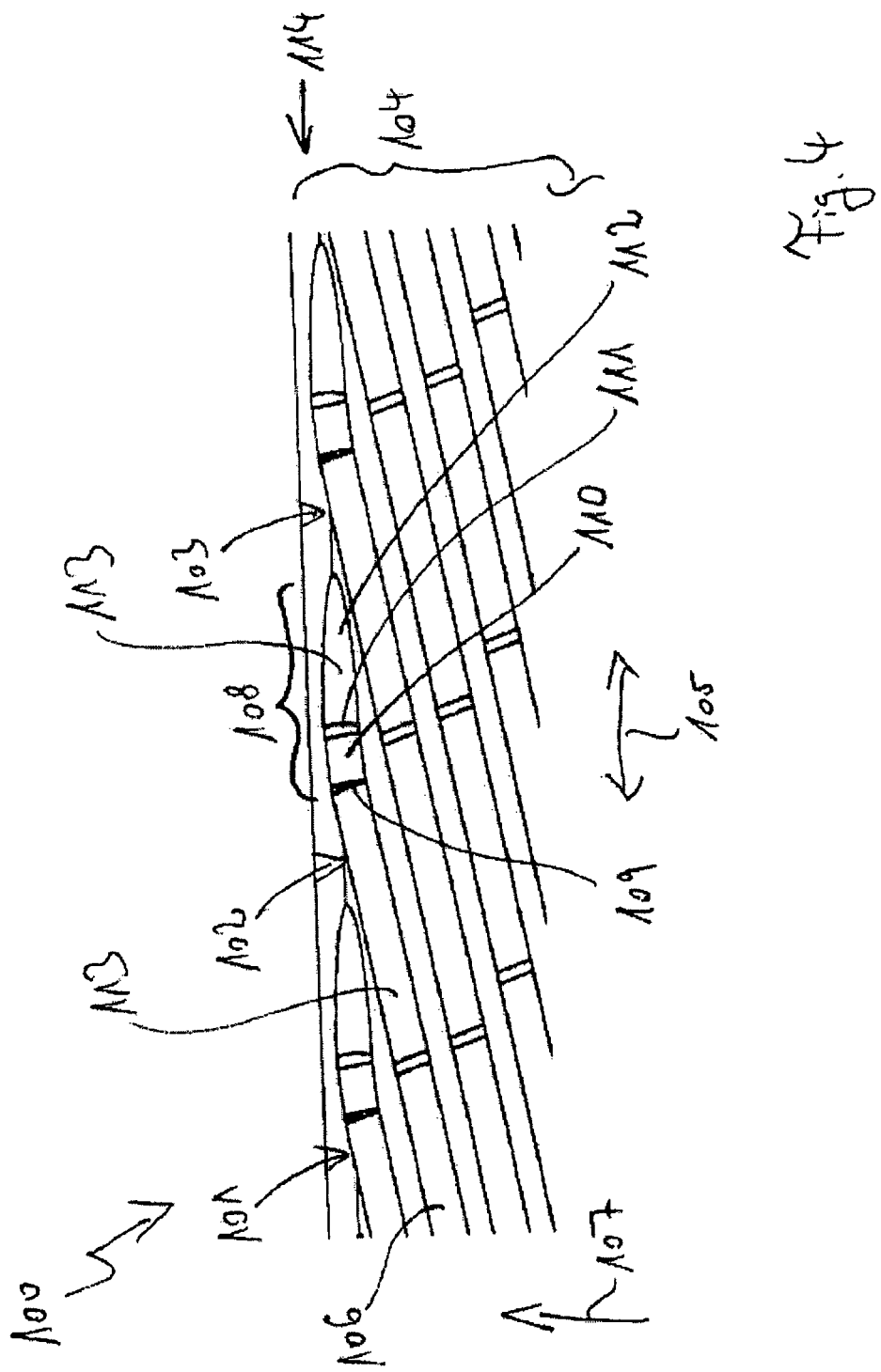

In the spiral distributor 100 in FIG. 4, a host of spiral channels 101, 102, 103 (exemplarily labeled) runs in an overlap area 104 in a multiple screw respectively spiral shape relative to each other. All the spiral channels 101, 102, 103 are geometrically congruent, but begin and discontinue offset in a direction of the circumference 105 around the spiral distributor 100.

Beginning with transition sections (not shown) of the spiral distributors 101, 102, 103, these run in further sections 106 (exemplarily labeled) in a course which is straight when developed, that is with a constant angle relative to a distributor flow direction 107.

The further sections 106 however are not discontinued with a straight course of the spiral channels 101, 102, 103, but rather have respectively one shortening section 108 (exemplarily labeled).

In the shortening section 108, the spiral channels 101, 102, 103 continue initially with a first bend 109 toward a greater bending relative to the distributor flow direction 107. There, they run straight for a short part 110.

They subsequently have another bend 111, from which they run on without or with only an extremely low rise. In a last straight running section 112 (exemplarily labeled) the spiral channels 101, 102, 103 respectively their shortening sections 108 are discontinued very soon. This is accomplished by the fact that in the last part 112 of the shortening section 108, a channel floor 113 rises by a multiple of a rise relative to the rise of the channel floor in the further section 106 of the same spiral channel 101, 102, 103.

There, the spiral channel 101, 102, 103 correspondingly becomes very narrow.

A merge of the directly adjacent spiral channels 101, 102, 103 does not even occur.

The spiral channels 101, 102, 103 with their shortening sections 108 nevertheless form a ring channel 114—albeit interrupted—around the spiral distributor 100.

An advantage can already occur if only one individual spiral channel 101, 102, 103 has a shortening section 108.

It is preferable if several, preferably all spiral channels 101,102, 103 of a spiral distributor 100 are equipped with a shortening section 108, the shortening section 108 being preferably shaped identically in all the spiral channels 101, 102, 103.

A spiral distributor can be designed particularly advantageously if it not only has shortening sections 108 as shown in FIG. 4 but additionally has acceleration means for a better overflow of the melt over the overflow bars. Such means are described above in detail with reference to FIG. 3. It must explicitly pointed out that the invention presented here can be improved again by individual, several or all features of its description through an adequate design.

It must be explicitly mentioned that the course and the cross-section geometries can be disposed not only in the mandrel or in the distributor plate but also in the counterpart disposed to that end.

Furthermore it must be explicitly mentioned that the invention can be used advantageously for one-layer die heads as well as for multi-layer die heads.

The invention claimed is:

1. A spiral distributor for a die head of a foil extrusion line, with a central axis and with a distributor flow direction, the distributor flow direction lying parallel to the central axis in the case of an axial spiral distributor, radially in the case of a radial spiral distributor and in the case of a conical spiral distributor so that it is projectable onto the axis, the spiral channels running at an angle to the distributor flow direction, a first spiral channel passing a second adjacent spiral channel downstream from its beginning after an initial section and running on downstream in a further section, wherein a spiral channel has a shortening section initiating from its further section, and wherein with regard to a spiral channel depth the shortening section has a stronger flattening relative to the further section, the stronger flattening comprising a sudden divergence of the spiral channel depth.

2. The spiral distributor according to claim 1, wherein with regard to its course, the shortening section has a bend, a curve or a deviation.

3. The spiral distributor according to claim 1, wherein with regard to its course, a spiral channel has another rise height in its shortening section that in its further section, more specifically a lesser rise height, particularly up to a rise height of zero.

4. The spiral distributor according to claim 1, wherein shortening sections of spiral channels are merged.

5. The spiral distributor according to claim 1, wherein shortening sections of spiral channels form an annular gap around the spiral distributor and/or lead into an annular gap.

6. The spiral distributor according to claim 1, wherein the shortening section has, with regard to a spiral channel width, a stronger tapering relative to the further section.

7. The spiral distributor according to claim 6, wherein the shortening section has a channel floor step, and/or a channel floor rise which amounts at least to twice the rise of a channel floor in the further section.

8. Die head for a blown film line, with a spiral distributor according to claim 1.

9. A blown film line with an extruder, a die head according to claim 8, a flattening unit and an extractor device.

10. A method for manufacturing a blown film by using a blown film line according to claim 9.

* * * * *